UNITED STATES PATENT OFFICE.

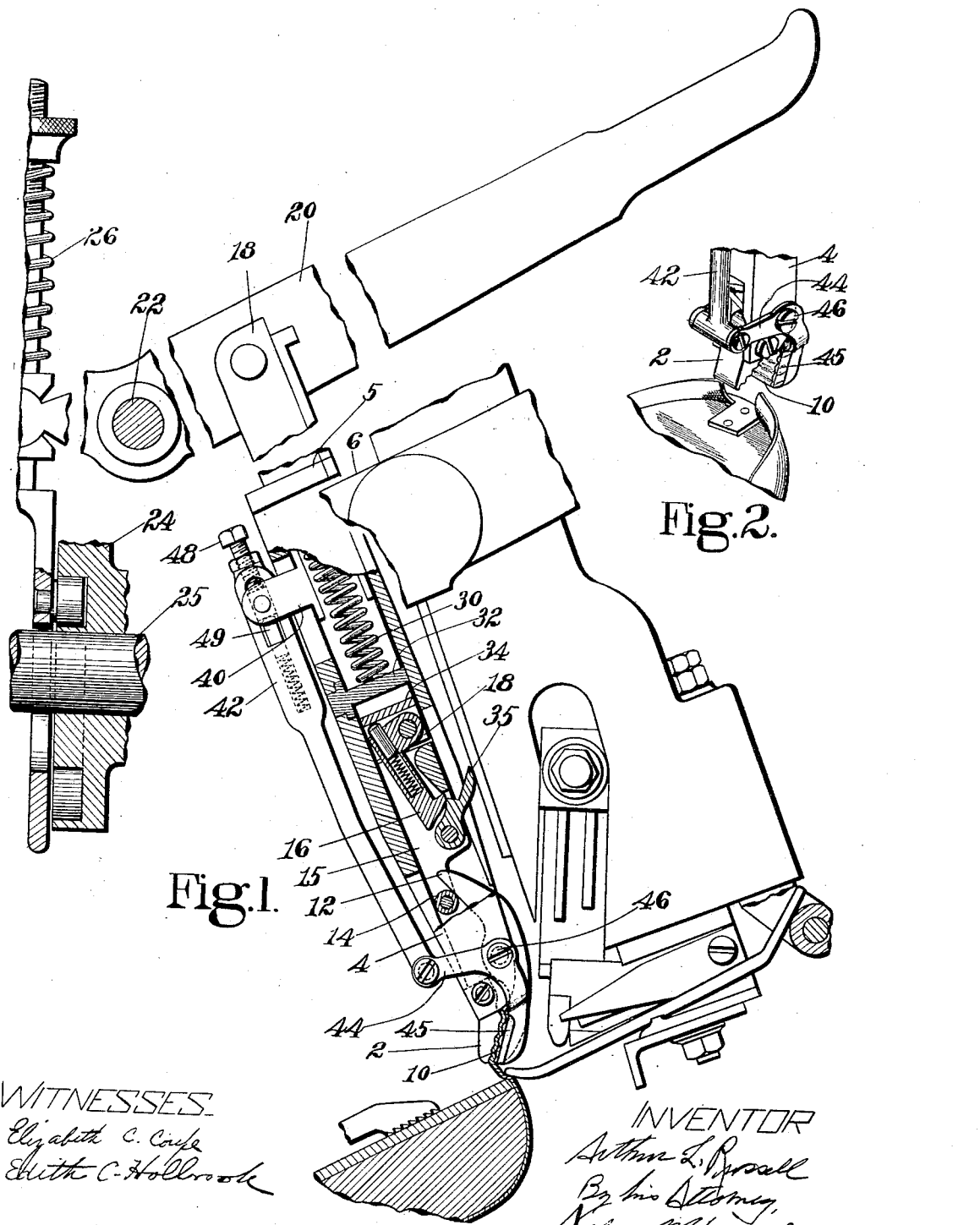

ARTHUR L. RUSSELL, OF BOSTON, MASSACHUSETTS, ASSIGNOR TO UNITED SHOE MACHINERY COMPANY, OF PATERSON, NEW JERSEY, A CORPORATION OF NEW JERSEY.

OPERATING MECHANISM FOR GRIPPERS AND SLITTERS OR THE LIKE.

1,125,886.  Specification of Letters Patent.  Patented Jan. 19, 1915.

Application filed November 19, 1913.  Serial No. 801,987.

*To all whom it may concern:*

Be it known that I, ARTHUR L. RUSSELL, a citizen of the United States, and residing at Boston, in the county of Suffolk and State of Massachusetts, have invented certain Improvements in Operating Mechanism for Grippers and Slitters or the like, of which the following description, in connection with the accompanying drawings, is a specification, like reference characters on the drawings indicating like parts in the several figures.

This invention relates to shoe machinery and has more particular reference to the economical operation of such working devices in shoe machinery as the gripper mechanisms in pulling-over machines or pincer lasting machines. It is herein shown as embodied in a gripper mechanism of the type shown and claimed in United States Letters Patent No. 1,030,264, granted June 18, 1912 on application of Ronald F. McFeely. This gripper is characterized by two features either or both of which, or equivalent features, may be made use of in accordance with this invention.

One feature is that the jaw closing mechanism includes a spring with which a closing device is connected to close the jaws by a partial expansion of the spring, the connection permitting disengagement to allow the jaws to open for releasing the stock and to permit an automatic further expansion of the spring.

The second feature of this mechanism is that the gripper is actuated to pull the upper by a connection, including a yielding element, with a cam or the like and when the gripper is released during its tensioning or holding of the upper this yielding element reacts to lift the gripper automatically away from the shoe.

A particular object of this invention is to utilize the automatic expansion of the closing spring or a portion of the force causing the automatic withdrawing movement of the gripper, or both, to do useful work. These forces are largely in excess of the work which they accomplish and heretofore they have been expended futilely, and sometimes with such objectionable shock to parts of the machine that provision appeared necessary to mitigate the evil as explained for example in United States Letters Patent No. 1,095,261, granted May 5, 1914 on application of Arthur Bates.

A more general object of this invention is to combine one working device, such for example as a gripper, and an operating means therefor, which may for example include a spring in which power is stored after said device has been operated, as for instance to grip the upper or to pull the upper if the device is a gripper, with a second working device and an operative connection from the operating means thereto arranged to cause the second device to be actuated from said means only after the first device has completed its work, as for instance by power stored in the spring if a spring is an element of the operating means.

One of perhaps many operations for which energy can be employed which is now wasted in the operation of grippers is for slitting the upper to facilitate smooth plaiting of it upon the shoe bottom and herein the invention is shown for illustrative purposes as embodied in means by which slitting knives are so operated by the surplus energy that is available in the pulling-over gripper mechanism when the jaws open, or directly thereafter.

The features of the invention will appear more fully from the following description in connection with the accompanying drawings and the invention will then be more definitely pointed out in the claims.

Figure 1 is a side elevation, partly in section, of the toe gripper and associated parts of a pulling-over machine of the type shown in said patent; Fig. 2 is a perspective view showing the gripper and the work at the end of the operation.

The illustrated gripper and operating mechanism includes a jaw 2 which is rigidly fixed in a casing 4 that extends upwardly through and moves in an opening in the frame 6, said casing having lateral ears 5 at its upper end which engage with the frame and limit the downward movement of the gripper. A jaw 10 is pivoted to the casing and has an upwardly and backwardly extending tail 12 below and back of which is a roll 14 that is carried by a slide 15 that is detachably connected by a hook 16 with the lower end of an operating bar 18 suspended from an updraw lever 20 that is fulcrumed at 22 and is connected at its rear end with a cam 24 on the power shaft 25 by means including a spring 26 which allows the cam to make its full stroke while the gripper rises only so far as the stock engaged by it will permit, until the jaws are released from the stock. Then the spring 26 reacts to withdraw the jaws upwardly away from the shoe to give place to the tacker which is shown at the right of the gripper in Fig. 1. Damage to the lever 20 or other parts by too forceful upward movement of the lever may be avoided by the means described in said Bates patent but not necessary here to show.

The closing of the jaws before they begin to rise from the work is effected by a spring 30 that bottoms against a cross bar 32 in the casing and extends upwardly into a chamber in the operating bar 18 between which and the cross bar it is confined under pressure, being allowed to expand partially to raise the bar 18 and attached slide 15 and close the jaws when the cam 24 is turned to permit the lever 20 to be so moved, and being again compressed when the cam 24 forces the operating bar 18 down with relation to the casing while the ears 6 rest on frame 5. The opening of the jaws while they hold the upper under tension, as in Fig. 1, is effected by a latch 35 that stands in the path of the tacker and is moved thereby to disengage the hook 16 from under a portion of the latch. When such disengagement occurs the springs 26 and 30 are free to expand and they move the operating bar 18 upward both relatively to the casing 4 against which spring 30 presses down until cross bar 32 strikes the operating bar at 34, and also with that casing to raise the jaws from the work, all as more fully explained in said prior McFeely patent.

In accordance with the illustrated embodiment of this invention a connection from the operating bar 18 is provided through which work can be done by the described movement thereof after the jaws have released the upper. As shown the bar has a rearwardly extending lug 40 projecting through an elongated slot in the casing 4, and connected by rod 42 with the operating arms 44 of upper slitting knives 45. The knives are pivoted on the casing 4 by the same pin 46 as the jaw 10 and swing in sliding contact with the lateral edges of the jaws, jaw 2 coöperating with the knives as a shear blade. When the jaws are open the knives stand at the sides of the jaw 10 with their edges slightly back of the gripping face of said jaw which protects them, as in Fig. 2. When the jaws are closed the blades are swung toward the upper that is within the jaws as shown in Fig. 1. When the latch is tripped to unhook the operating bar 18 from slide 15 the spring 30 produces relative movement of the bar 18 and casing and the knives are turned by the rod 42 and caused to cut with a shearing action into or through the upper. The spring 26 also lifts the gripper away from the shoe thereby moving the knives relatively to the upper to effect a slicing or drawing cut in case the knives have not cut through the upper before the grippers begin to rise. The described connections will operate the knives to produce the slits shown in Fig. 2 for forming a tongue of upper to be tacked down and over which the upper from either side can be smoothly plaited in lasting a pulled-over McKay shoe. An adjusting screw 48 in the upper end of the rod 42 provides for setting the knives with their edges in desired relation to the stock engaging faces of the jaws and a spring plunger 49 takes up lost motion at the adjusting point.

It will be noted that the knives are operated by the use of force or power which, in so far as it is derived from the spring 30, heretofore has not served any useful purpose and which, in so far as it is derived from the spring 26, is in excess of the requirements for raising the gripper to an out of the way position. It is within this invention to use this or similar waste force for any other purpose than operating slitting knives, to which it may advantageously be applied by the described or any other suitable connections.

Having explained the nature of this invention and described an illustrative construction embodying the same, I claim and intend to secure by Letters Patent of the United States all the patentable novelty of which this invention is possessed in view of the prior art and desire that the following claims shall be construed to give effect to this intention.

I claim—

1. A machine of the class described having, in combination, a gripper, a gripper operating mechanism including a cam and a yielding element permitting normal movement of the cam while the gripper movement is shortened by the resistance of the stock, a device other than the gripper for operating on the work, and connections between said device and said yielding element through which said device is operated by the force of the yielding element when the gripper is freed from the resistance of the stock.

2. A machine of the class described having, in combination, a gripper, a gripper closing mechanism including a spring, a variable portion of the force of which is utilized in closing the gripper upon varying thicknesses of stock, and another device operatively connected with the spring and actuated automatically by a remaining portion of the force of the spring when the gripper is freed from the stock.

3. A gripper mechanism comprising jaws and a closing spring which is arranged to be tensioned when the jaws are opened and to react more or less to close the jaws according to the thickness of the stock gripped, means for freeing the jaws from the stock and permitting further reaction of the spring, a device for operating on the work, and connections from said device to the spring through which the spring is caused during such further reaction to operate the device to do work on the stock.

4. A gripper mechanism comprising jaws and an updrawing spring, and operating mechanism acting through said spring to pull the upper and to store power in the spring to hold the upper under tension, means by which to free the stock from the pull of the spring and permit the spring to react and exert some of the power stored in it, a device for operating on the work, and connections from said device to the spring through which the spring is caused to operate the device to do work during such reaction.

5. A machine of the class described having, in combination, a tool for working on stock, an operating cam, a connection from the cam to the tool including a spring permitting full movement of the cam while the stroke of the tool is arrested by resistance of the work, said tool being constructed and arranged to be freed from the resistance of the work while the spring is under tension resulting from such resistance, a second tool, and connections thereto for utilizing the reaction of the spring for operating said second tool when the first is freed from said resistance.

6. A machine of the class described having, in combination, a gripper constructed and arranged to be freed from the work while holding an upper under tension, operating means including a spring by which the gripper is caused to put the upper under tension, means to free it from the upper, a slitting knife and connections therefrom through which the knife is operated to slit the upper by the force stored in the spring when the gripper is freed from the upper.

7. A gripper mechanism comprising a pivoted jaw, a coöperating jaw, a pivoted slitting knife, closing mechanism comprising a device which has a variable length of movement to turn the pivoted jaw for gripping work of varying thickness and completes its stroke when the jaws are freed from the upper, and a connection from said device by which the knife is turned to slit the upper by the last mentioned portion of the movement of said device.

8. A gripper mechanism comprising the fixed and pivoted jaws, the closing mechanism therefor including the slide 15, hook 16, bar 18 and spring 30 arranged to operate substantially as described, the unhooking latch 35, the knife 45 and the operating connection 40, 42, 44 from the bar through which the knife is actuated to move relatively to the fixed jaw to cut the stock interposed between it and said fixed jaw after the hook is disengaged from the slide.

9. A gripper mechanism comprising the fixed and pivoted jaws, the operating mechanism therefor including the slide 15, hook 16, bar 18, lever 20, cam 24 and relief spring 26 arranged to operate substantially as described to uplift the jaws to stretch the upper and then for the spring to carry the jaws away from the work when they are released from the upper, a knife movable with the jaws and operated by the spring to slit the upper with a drawing cut as the jaws are moved away from the work.

10. In a machine of the class described, the combination with gripper jaws and an operating bar therefor, of an upper slitting knife and an operative connection from the bar to the knife arranged to apply pressure to the knife in the direction to force the knife through the stock.

11. In a machine of the class described the combination with gripper jaws and an operating bar therefor, of an upper slitting knife and an operating connection from the bar to the knife arranged to force the knife through the stock only after the jaws have fully gripped the stock.

12. In a machine of the class described the combination with gripper jaws and an operating bar therefor, of an upper slitting knife and an operating connection from the bar to the knife arranged to cause the knife to do its work by a further movement of the bar after the jaws have seized and pulled the stock.

13. In a machine of the class described the combination with one working device and an operating means therefor, of a second working device and an operative connection from said means thereto arranged to cause the second device to be actuated to do its work from said means only after the first device has completed its work.

14. In a machine of the class described, the combination with one working device and an operating means therefor including a spring in which power is stored after the first device has operated, of a second working device arranged for subsequent actuation to do its work by such stored power.

In testimony whereof I have signed my name to this specification in the presence of two subscribing witnesses.

ARTHUR L. RUSSELL.

Witnesses:
 JENNIE P. ANDERSON,
 HARLOW M. DAVIS.

Copies of this patent may be obtained for five cents each, by addressing the "Commissioner of Patents, Washington, D. C."